(12) United States Patent  (10) Patent No.: US 8,612,562 B2
Sugawara  (45) Date of Patent: Dec. 17, 2013

(54) NETWORK SYSTEM CAPABLE OF PROVIDING PROXY WEB SERVICE AND PROXY RESPONSE METHOD THEREFOR, NETWORK DEVICE, INFORMATION PROCESSING DEVICE, AND CONTROL METHODS THEREFOR, AND STORAGE MEDIUM

(75) Inventor: Kazuhiro Sugawara, Tokyo (JP)

(73) Assignee: Canon Kabushiki Kaisha (JP)

( * ) Notice: Subject to any disclaimer, the term of this patent is extended or adjusted under 35 U.S.C. 154(b) by 295 days.

(21) Appl. No.: 13/036,434

(22) Filed: Feb. 28, 2011

(65) Prior Publication Data

US 2011/0219104 A1  Sep. 8, 2011

(30) Foreign Application Priority Data

Mar. 3, 2010 (JP) ................................. 2010-046562

(51) Int. Cl.
*G06F 15/173* (2006.01)

(52) U.S. Cl.
USPC ........... 709/223; 709/201; 709/202; 709/218; 709/232; 709/238

(58) Field of Classification Search
USPC .................. 709/201, 202, 218, 223, 232, 238
See application file for complete search history.

(56) References Cited

U.S. PATENT DOCUMENTS

| 7,286,252 | B2 * | 10/2007 | Kawabuchi et al. | 358/1.15 |
|---|---|---|---|---|
| 2003/0112752 | A1 * | 6/2003 | Irifune et al. | 370/229 |
| 2006/0264202 | A1 * | 11/2006 | Hagmeier et al. | 455/411 |
| 2007/0124471 | A1 * | 5/2007 | Harada et al. | 709/225 |
| 2008/0109619 | A1 * | 5/2008 | Nakanishi | 711/159 |
| 2009/0150534 | A1 * | 6/2009 | Miller et al. | 709/223 |
| 2009/0271526 | A1 * | 10/2009 | Watanabe et al. | 709/236 |
| 2010/0125742 | A1 * | 5/2010 | Ohtani | 713/310 |
| 2011/0231511 | A1 * | 9/2011 | Mo | 709/217 |

FOREIGN PATENT DOCUMENTS

CN  1788247 A  6/2006
JP  2000-165419 A  6/2000

OTHER PUBLICATIONS

CN OA issued May 22, 2013 for corresponding CN 201110051388.4.

* cited by examiner

*Primary Examiner* — Liangche A Wang
(74) *Attorney, Agent, or Firm* — Rossi, Kimms & McDowell LLP

(57) ABSTRACT

A network system in which a proxy web service process performed by a device on behalf of a network device can be continued while maintaining a reduced power consumption state of the network device, without requiring these devices to be installed on the same subnet. When in a sleep state, the network device redirects a web service request received from a PC to an external device. The external device sends a web service response to the web service request in which addresses of the external device are designated as a reference destination of data contained in the web service response, to the network device. The network device sends the web service response to the network terminal.

16 Claims, 13 Drawing Sheets

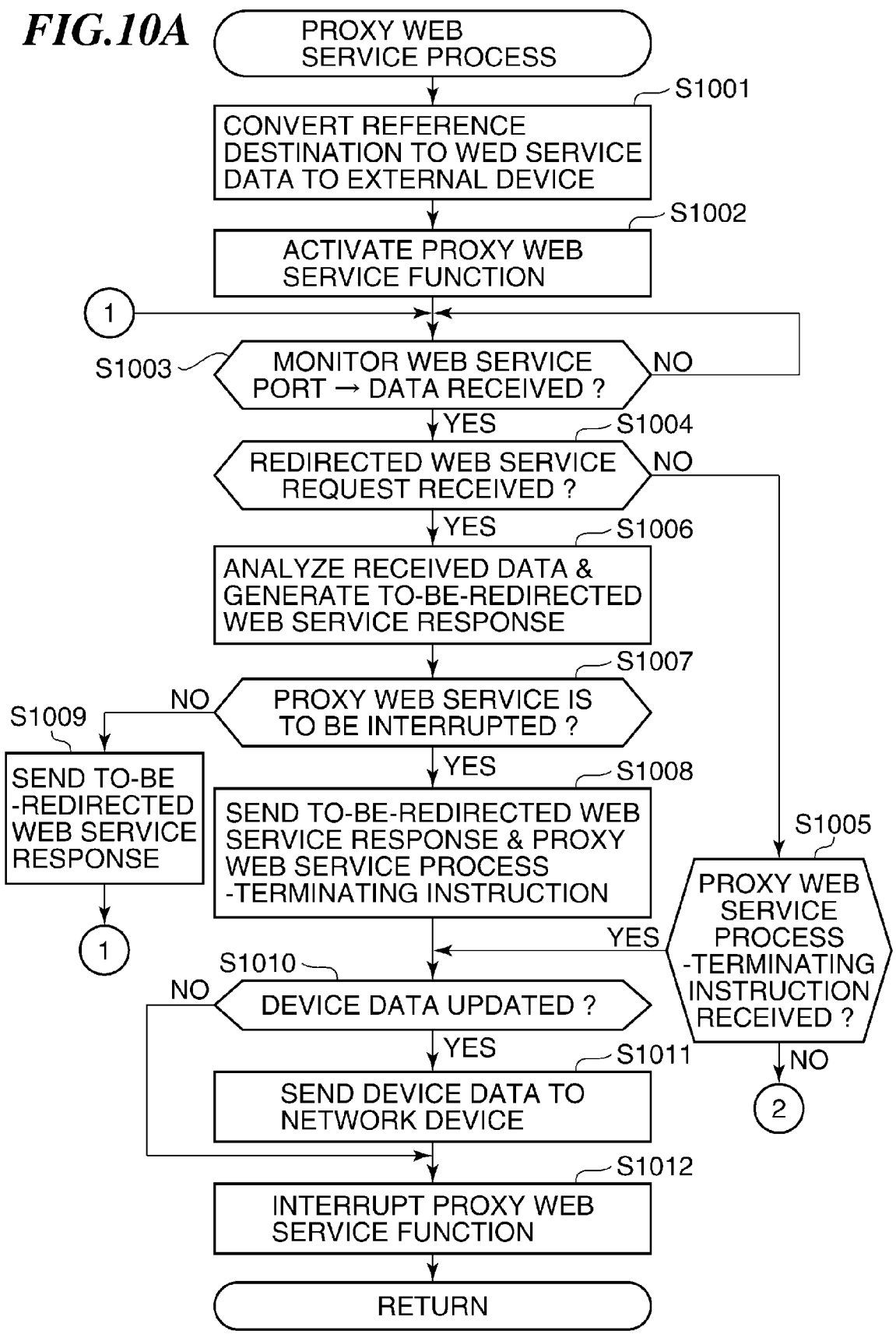

NETWORK SYSTEM CAPABLE OF PROVIDING PROXY WEB SERVICE AND PROXY RESPONSE METHOD THEREFOR, NETWORK DEVICE, INFORMATION PROCESSING DEVICE, AND CONTROL METHODS THEREFOR, AND STORAGE MEDIUM

BACKGROUND OF THE INVENTION

1. Field of the Invention

The present invention relates to a network system and a proxy response method therefor, a network device, an information processing device, and control methods therefor, and a storage medium, and particularly to a network technique in which a network device that provides a web service on a LAN causes an information processing device on the Internet to execute the web services on behalf of the network device.

2. Description of the Related Art

Some of image processing devices, such as a multifunction peripheral, are configured to be capable of communicating with information processing devices, such as PCs on a network, as network devices, and provide various kinds of web services including remote user interface, printing, and scanning, for the devices. The remote user interface enables a user to access from a PC on the network to access a network device, and view information, such as registration and jobs, stored in the network device.

Further, some of the network devices having the function of providing web services have a power saving function for shifting to a sleep (reduced power consumption) state when not in use, so as to reduce power consumption. Further, there is a network device having a proxy response function that responds to an access received from a terminal, using a network interface card (NIC) alone, when in the sleep state. In this case, the proxy response that returns an automatic response using a simple filter cannot respond to web service requests.

Further, there has been proposed a network system in which a proxy response server is installed on the same LAN to which first and second clients are connected, and maintains the sleep state of the first client (see e.g. Japanese Patent Laid-Open Publication No. 2000-165419). This proxy response server stores data items from the second client received by the first client and response messages to the received data items from the first client in a database within its own device, and monitors each received data items addressed from the second client to the first client. Then, when data which matches a received data item exists in the database, the proxy response server responds to the second client by one of the response messages associated with the received data item, on behalf of the first client.

However, in a device which provides web services, when a web service request is received from a client on the network during the sleep state, it is necessary for the device to return to the standby state from the sleep state to respond to the request.

Further, according to the technique disclosed in Japanese Patent Laid-Open Publication No. 2000-165419, when the proxy response server responds on behalf of the first client while maintaining the sleep state of the first client, it is necessary for the proxy response server to monitor each message addressed to the first client. Further, the proxy response is realized by the proxy response server monitoring packet data addressed to the first client, and hence it is necessary for the first client and the proxy response server to be installed on the same subnet.

SUMMARY OF THE INVENTION

The present invention provides a network technique that makes it possible to continue a proxy web service, without requiring a network device that provides a web service and a device that provides the proxy web service device on behalf of the network device to be installed on the same subnet, while maintaining a reduced power consumption state of the network device.

In a first aspect of the present invention, there is provided a network system including a network device that provides a web service to a network terminal, and an information processing device that provides the web service on behalf of the network device, wherein the network device comprises a first web service unit configured to generate and return, in response to receipt of a web service request for receiving the web service from the network terminal, a web service response to the web service request, a shifting unit configured to shift the network device to a predetermined state including a reduced power consumption state, a first redirection unit configured to be operable when the network device has been shifted to the predetermined state by the shifting unit, to redirect a web service request received from the network terminal to the information processing device, a reception unit configured to receive, from the information processing device, a web service response which responds to the web service request redirected by the first redirection unit and in which the information processing device is designated as a reference destination of data contained in the web service response, and a second redirection unit configured to redirect the web service response received by the reception unit to the network terminal, and wherein the information processing device comprises a second web service unit configured to generate and return, to the network device, the web service response which responds to the web service request redirected from the network device by the first redirection unit and in which the information processing device is designated as the reference destination of the data contained in the web service response.

In a second aspect of the present invention, there is provided a network device that provides a web service to a network terminal and performs communication with an information processing device which provides the web service on behalf of the network device, comprising a web service unit configured to generate and return, in response to receipt of a web service request for receiving the web service from the network terminal, a web service response to the web service request, a shifting unit configured to shift the network device to a predetermined state including a reduced power consumption state, a first redirection unit configured to be operable when the network device has been shifted to the predetermined state by the shifting unit, to redirect a web service request received from the network terminal to the information processing device, a reception unit configured to receive, from the information processing device, a web service response which responds to the web service request redirected by the first redirection unit and in which the information processing device is designated as a reference destination of data contained in the web service response, and a second redirection unit configured to redirect the web service response received from the information processing device by the reception unit to the network terminal.

In a third aspect of the present invention, there is provided an information processing device that performs communication with a network device which provides a web service to a network terminal, and provides the web service on behalf of the network device, comprising a reception unit configured to receive a web service request which is dispatched from the network terminal and is redirected by the network device, a generation unit configured to be operable when the reception unit receives the web service request, to generate a web service response which responds to the web service request and in which the information processing device is designated as a reference destination of data included in the web service response, and a transmission unit configured to transmit the web service response generated by the generation unit to the network device.

In a fourth aspect of the present invention, there is provided a proxy response method in a network system including a network device that provides a web service to a network terminal, and an information processing device that provides the web service on behalf of the network device, comprising generating and returning, in response to receipt of a web service request for receiving the web service from the network terminal by the network device, a web service response to the web service request, shifting the network device to a predetermined state including a reduced power consumption state, redirecting, when the network device has been shifted to the predetermined state, a web service request received from the network terminal to the information processing device, generating and returning to the network device, by the information processing device, a web service response which responds to the web service request redirected from the network device and in which the information processing device is designated as a reference destination of data contained in the web service response, receiving the web service response from the information processing device, by the network device, and redirecting the web service response received from the information processing device by the network device to the network terminal.

In a fifth aspect of the present invention, there is provided a method of controlling a network device that provides a web service to a network terminal and performs communication with an information processing device which provides the web service on behalf of the network device, comprising generating and returning, in response to receipt of a web service request for receiving the web service from the network terminal, a web service response to the web service request, shifting the network device to a predetermined state including a reduced power consumption state, redirecting, when the network device has been shifted to the predetermined state, a web service request received from the network terminal to the information processing device, receiving, from the information processing device, a web service response which responds to the redirected web service request and in which the information processing device is designated as a reference destination of data contained in the web service response, and redirecting the web service response received from the information processing device to the network terminal.

In a sixth aspect of the present invention, there is provided a method of controlling an information processing device that performs communication with a network device which provides a web service to a network terminal, and provides the web service on behalf of the network device, comprising receiving a web service request which is dispatched from the network terminal and is redirected by the network device, generating, when the web service request is received, a web service response which responds to the web service request and in which the information processing device is designated as a reference destination of data included in the web service response, and transmitting the generated web service response to the network device.

In a seventh aspect of the present invention, there is provided a non-transitory computer-readable storage medium storing a computer-executable program which functions in a network system including a network device that provides a web service to a network terminal, and an information processing device that provides the web service on behalf of the network device, wherein the program causes the network device to function as a first web service unit configured to generate and return, in response to receipt of a web service request for receiving the web service from the network terminal, a web service response to the web service request, a shifting unit configured to shift the network device to a predetermined state including a reduced power consumption state, a first redirection unit configured to be operable when the network device has been shifted to the predetermined state by the shifting unit, to redirect a web service request received from the network terminal to the information processing device, a reception unit configured to receive, from the information processing device, a web service response which responds to the web service request redirected by the first redirection unit and in which the information processing device is designated as a reference destination of data contained in the web service response, and a second redirection unit configured to redirect the web service response received by the reception unit to the network terminal, and wherein the program causes the information processing device to function as a web service unit configured to generate and return, to the network device, a web service response which responds to the web service request redirected from the network device by the first redirection unit and in which the information processing device is designated as a reference destination of data contained in the web service response.

In an eighth aspect of the present invention, there is provided a non-transitory computer-readable storage medium storing a computer-executable program which functions in a network device that provides a web service to a network terminal, wherein the program causes the network device to function as a web service unit configured to generate and return, in response to receipt of a web service request for receiving the web service from the network terminal, a web service response to the web service request, a shifting unit configured to shift the network device to a predetermined state including a reduced power consumption state, a first redirection unit configured to be operable when the network device has been shifted to the predetermined state by the shifting unit, to redirect a web service request received from the network terminal to an information processing device, a reception unit configured to receive, from the information processing device, a web service response which responds to the web service request redirected by the first redirection unit and in which the information processing device is designated as a reference destination of data contained in the web service response, and a second redirection unit configured to redirect the web service response received from the information processing device by the reception unit to the network terminal.

In a ninth aspect of the present invention, there is provided a non-transitory computer-readable storage medium storing a computer-executable program which functions in an information processing device that performs communication with a network device which provides a web service to a network terminal, and provides the web service on behalf of the network device, wherein the program causes the information processing device to function as a reception unit configured to receive a web service request which is dispatched from the network terminal and is redirected by the network device, a generation unit configured to be operable when the reception unit receives the web service request, to generate a web service response which responds to the web service request and in which the information processing device is designated as a reference destination of data included in the web service response, and a transmission unit configured to transmit the web service response generated by the generation unit to the network device.

According to the present invention, it is possible to continue a proxy web service, without requiring a network device that provides a web service and a device that provides the proxy web service device on behalf of the network device to be installed on the same subnet, while maintaining a reduced power consumption state of the network device.

The features and advantages of the invention will become more apparent from the following detailed description taken in conjunction with the accompanying drawings.

BRIEF DESCRIPTION OF THE DRAWINGS

FIGS. 10A and 10B are a flowchart of the proxy web service process executed by an external device of the network system according to the second embodiment.

DETAILED DESCRIPTION OF THE EMBODIMENTS

The present invention will now be described in detail below with reference to the accompanying drawings showing embodiments thereof.

Figure 1:
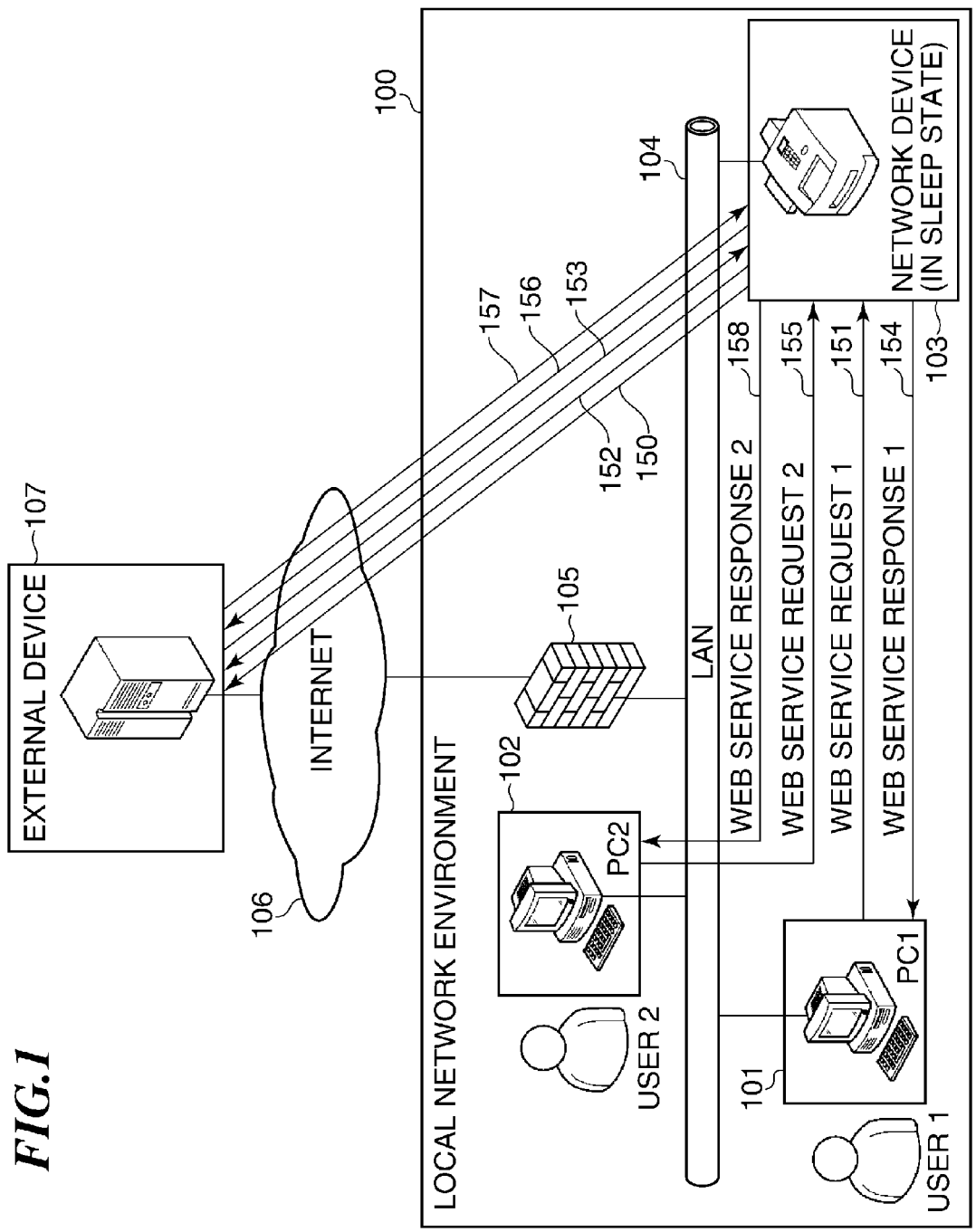
FIG. 1 is a schematic diagram of a network system according to a first embodiment of the present invention.

FIG. 1 schematically illustrates a network system according to a first embodiment of the present invention.

In FIG. 1, a local network environment 100 is e.g. a LAN built in an office or the like, and includes a plurality of PCs (personal computers) and an image processing device, such as a multifunction peripheral. A PC 1 101 and a PC 2 102 are information processing devices connected to a LAN 104. A user 1 is a user of the PC 1 101, and a user 2 is a user of the PC 2 102.

A network device 103 is an image processing device configured to be capable of communicating with the PC 1 101 and the PC 2 102 via the LAN 104, and is equipped with various kinds of web service functions, such as remote user interface, printing, and scanning. The LAN 104 is connected to the Internet 106 via a firewall 105. It should be noted that the firewall 105 may be a PC or a router insofar as it is equipped with a firewall function.

An external device 107 is an information processing device configured as a server or the like, and is installed on the Internet 106. It should be noted that the external device 107 may be an image processing device, such as a multifunction peripheral, insofar as it is equipped with functions, described hereinafter.

Data transmission from the network device 103 to the external device 107 is permitted or not permitted by the firewall 105, and hence the network device 103 can access the external device 107 by direct addressing. On the other hand, the external device 107 cannot access the network device 103 by direct addressing, but the external device 107 can return a response to data received from the network device 103. Further, the external device 107 can return a response not only to data received from the network device 103 but also to data received from other terminals (PC 1 101, etc.).

The network device 103 has a power saving function for shifting to a "sleep (reduced power consumption) state" when the network device 103 is not in use in order to reduce power consumption, and sends a proxy web service process start instruction 150 to the external device 107 when shifting to the sleep state. Upon receipt of the proxy web service process start instruction 150, the external device 107 starts a proxy web service process.

When the user 1 intends to enjoy a web service provided by the network device 103, the user 1 activates a web browser on the PC 1 101. After the user 1 inputs the address of the network device 103 on the web browser, the web browser dispatches a web service request 1 151 to the network device 103 via the LAN 104. It should be noted that in the following description, "request", "instruction", "redirected request or to-be-redirected response", etc. sent and received between the devices appearing in FIG. 1 are performed by transmission of data.

When the network device 103 is in the standby state or the normal state other than the sleep state, it sends a web service response to the received web service request to the PC 1 which is a source i.e. sender of the web service request (first web service).

On the other hand, when the network device 103 receives the web service request 1 151 when it is in a predetermined state including the sleep state, the network device 103 redirects the request to the external device 107 as a redirected web service request 1 152 (first redirection) by a proxy response function, described hereinafter.

The external device 107 receives and analyzes the redirected web service request 1 152, and sends a to-be-redirected web service response 1 153 to the network device 103 as a response to the web service request. In the present embodiment, the web service request and response between the network device and the external device, and the web service request and response between the PC, etc. and the network device within the local network are different in data form, so that the former web service request and response are referred to as the redirected web service request and the to-be-redirected web service response, respectively.

Upon receipt of the to-be-redirected web service response 1 153, the network device 103 redirects the to-be-redirected web service response 1 153 to the PC 1 101 which is the source of the web service request, as a web service response 1 154, by the proxy response function (second redirection), while remaining in the sleep state. When the PC 1 101 receives the web service response 1 154, the web service response 1 to the requested web service is displayed on the PC 1 101 by the web browser.

The user 2 also similarly activates a web browser on the PC 2 102 when intending to enjoy a web service provided by the network device 103. After the user 2 inputs the address of the network device 103 on the web browser, the web browser dispatches a web service request 2 155 to the network device 103 via the LAN 104.

The network device 103 redirects the web service request 2 155 received in the sleep state to the external device 107 as a redirected web service request 2 156 (first redirection), by the proxy response function. The external device 107 receives and analyzes the redirected web service request 2 156, and sends a to-be-redirected web service response 2 157 to the network device 103 as a response to the web service request.

Upon receipt of the to-be-redirected web service response 2 157, the network device 103 redirects the received to-be-redirected web service response 2 157 to the PC 2 102 which is a source of the web service request, as a web service response 2 158, by the proxy response function (second redirection), while remaining in the sleep state. When the PC 2 102 receives the web service response 2 158, the web service response 2 to the requested web service is displayed on the PC 2 102 by the web browser.

As described above, in the present embodiment, when the network device 103 in the sleep state receives a web service request from the PC 1 101 or the like, the external device 107 provides the web service on behalf of the network device 103. Although, in the present embodiment, the external device 107 provides the web service on behalf of the network device 103 in the sleep state, the external device 107 may provide the web service on behalf of the network device 103 even in a state other than the sleep state. For example, also when the network device 103 is in a high-load state, which causes delay of a response to a web service request, or when the network device 103 cannot return a response due to an operation being performed for another web service at the time, the external device 107 may provide the web service on behalf of the network device 103.

Figure 2:
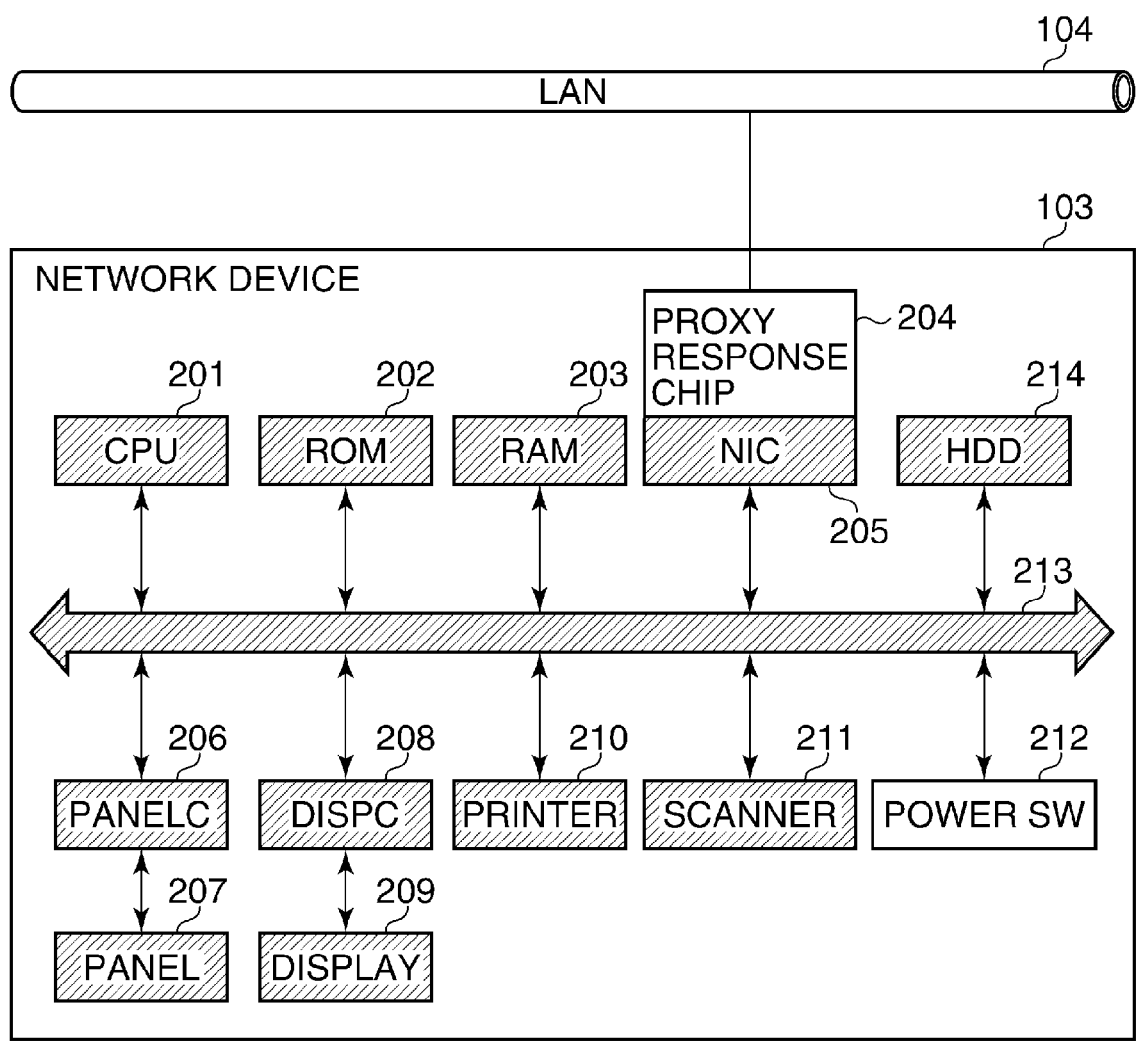
FIG. 2 is a block diagram showing the inner configuration of a network device appearing in FIG. 1.

FIG. 2 is a block diagram showing the inner configuration of the network device 103 appearing in FIG. 1.

The network device 103 includes a CPU (central processing unit) 201 that executes software stored in a ROM (read only memory) 202. The CPU 201 controls the overall operation of devices connected to a system bus 213. The ROM 202 is a nonvolatile memory that stores the software, which includes programs for executing processes, described hereinafter, etc. A HDD (hard disk drive) 214 stores device data (various settings, logs, and counters) of the network device. A RAM (random access memory) 203 functions as a main memory, a work area, etc. for the CPU 201.

An external input controller (PANELC) 206 is connected to a panel (PANEL) 207 including various keys and buttons, a touch panel, and so forth, and controls input instructions from the panel 207. A display controller (DISPC) 208 is connected to a display module (DISPLAY) 209 implemented by e.g. a liquid crystal display, and controls display on the display module 209.

A network interface card (NIC) 205 is connected to other network terminals, such as the PC 1 101 and a file server (not shown), via the LAN 104, and bi-directionally transmits and receives data to and from these. Further, the network interface card 205 is connected to the Internet 106 via the firewall 105.

The network interface card 205 includes a proxy response chip 204 having a proxy response function that responds without transferring packet data received via the LAN 104 to the system bus 213, when the network device 103 is in the sleep state. The proxy response chip 204 redirects a web service request received via the LAN 104 to the external device 107, and redirects a to-be-redirected web service request, to the PC or the like, by the proxy response function. Due to provision of the proxy response chip 204 in the network interface card 205, the network device 103 can respond to multicast packets frequently received from the network, while maintaining its state in which power consumption is very low (e.g. sleep state).

A printer section (PRINTER) 210 is a section for printing on sheets, which is implemented based on e.g. an electrophotographic or inkjet method. A scanner section (SCANNER) 211 is an image-reading section for reading images printed on sheets. A power switch section (POWER SW) 212 performs the overall power control of the network device 103, and electric power supply to the power switch section 212 is not interrupted even in the sleep state of the network device 103. To the sections illustrated by hatching in FIG. 2, the power switch section 212 executes power supply when the power switch section 212 is on, but interrupts the power supply when the power switch section 212 is off. When the network device 103 shifts to the sleep state, the power switch section 212 is set to off, whereby the electric power supply to those sections other than the proxy response chip 204 is interrupted.

The PC 1 101, the PC 2 102, and the external device 107 are each implemented by a general PC, and each include a CPU, a ROM, a RAM, an HDD (hard disk drive), a communication interface, a display device, and an operation input device, such as a keyboard and a mouse, none of which are shown, and description of these components are omitted.

Figure 3:
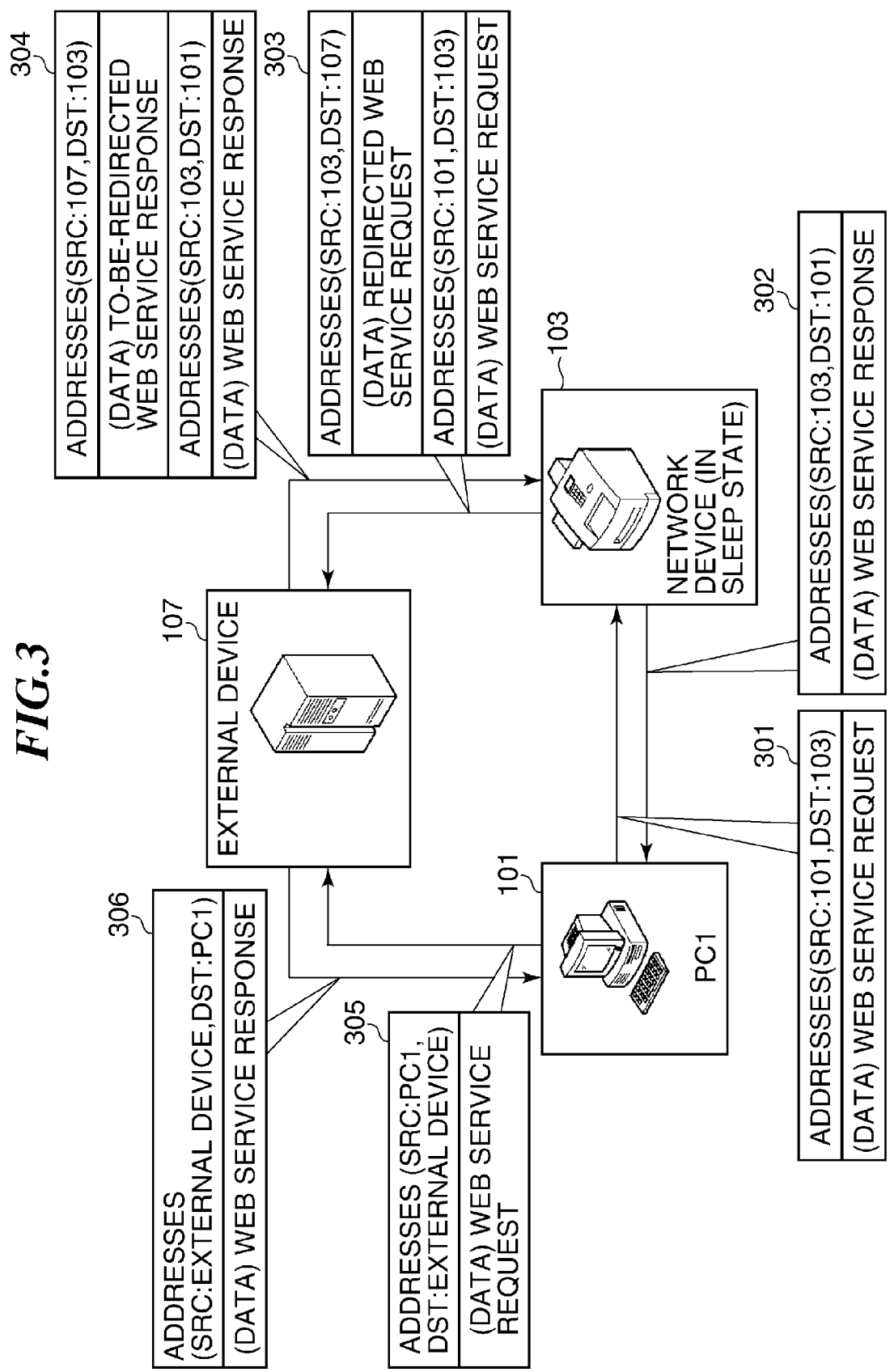
FIG. 3 schematically illustrates data forms sent and received within the network system shown in FIG. 1.

Next, a description will be given of forms of data sent and received within a network system (hereinafter referred to as the "web service system") described in the embodiments of the present invention with reference to FIG. 3. It should be noted that in FIG. 3, illustrations related to information to be described in a second embodiment are also included. Further, although FIG. 3 illustrates the PC 1 101, the description is the same even in a case where the PC in use is the PC 2 102.

A web service request 301 sent from the PC 1 to the network device has a data form in which a source address (SRC) and a destination address (DST) in a header portion thereof are set to the address of the PC 1 and the address of the network device, respectively, and web service request data is added. Examples of the web service request data include data of GET_Method and POST_Method of HTTP (Hyper Text Transfer Protocol).

A redirected web service request 303 redirected from the network device 103 to the external device 107 has a data form in which data indicative of web service request redirection (first redirection information) is added as a header portion thereof to the data of the above-mentioned web service request 301. As for the data indicative of the web service request redirection, i.e. the header portion, the source address (SRC) is set to the address of the network device 103 and the destination address (DST) is set to the address of the external device 107.

A to-be-redirected web service response 304 sent from the external device 107 to the network device 103 has a data form in which data indicative of web service response redirection (second redirection information), i.e. a header portion is added to data of a web service response 302, referred to hereinafter. As for the data indicative of the web service response redirection, i.e. the header, the source address (SRC)

is set to the address of the external device 107 and the destination address (DST) is set to the address of the network device 103.

The web service response 302 sent from the network device 103 to the PC 1 has a data form in which the data indicative of the web service response redirection, i.e. the header is deleted from the to-be-redirected web service response 304. That is, the source address (SRC) of the external device 107 and the destination address (DST) of the network device 103 are deleted, whereby the source address (SRC) is set to the address of the network device 103 and the destination address (DST) is set to the address of the PC 1 101. The data of the web service response includes, for example, HTML data responding to a GET_Method request of HTTP, image data (JBIG, JPEG, and GIF), and a JAVA (registered trademark) script.

The proxy response chip 204 of the network interface card 205 performs processing for responding to data received from the network during the sleep state, and hence when large volumes of data are received, or when complicated processing is executed, power consumption during the sleep state becomes large. To eliminate this inconvenience, in the present embodiment, the proxy response chip 204 executes only addition and deletion of a source address and a destination address to and from the header part of data (redirected web service request data or to-be-redirected web service response data). This makes it possible to easily transfer the web service request or response, and it is not necessary to receive large volumes of data and execute complicated processing, which makes it possible to reduce power consumption during the sleep state.

In the second embodiment, described hereinafter, when the external device 107 sends a to-be-redirected web service response to a web service request received from the network device 103, to the network device 103, thereby starting the proxy web service process, a web service request sent thereafter from the PC is transmitted to the external device 107 without via the network device 103, and a web service response to the request is transmitted to the PC. In this case, a web service request 305 sent from the PC 1 101 to the external device 107 has a data form in which the source address (SRC) and the destination address (DST) are set to the address of the PC 1 101 and the address of the external device 107, respectively, and the web service request data is added. On the other hand, a web service response 306 sent from the external device 107 to the PC 1 101 has a data form in which the source address (SRC) and the destination address (DST) are set to the address of the external device 107 and the address of the PC 1 101, respectively, and web service response data is added.

Next, a description will be given of a web service process executed by the network device 103 for causing the external device 107 to execute the proxy web service process during the sleep state.

Figure 4:
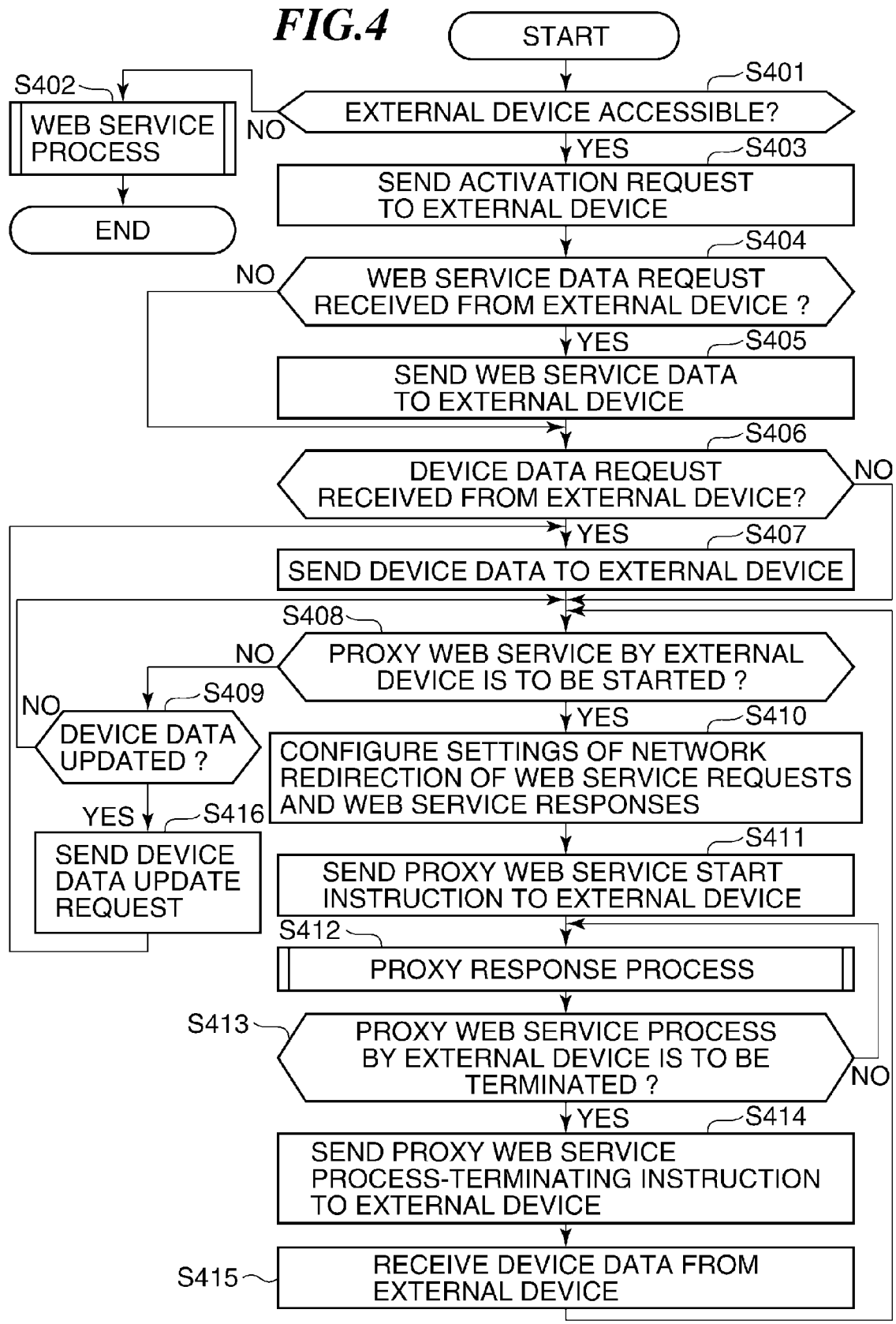
FIG. 4 is a flowchart of a web service process executed by the network device.

FIG. 4 is a flowchart of the web service process executed by the network device 103. This process is started immediately before the network device 103 shifts to the sleep mode on condition that there are satisfied predetermined conditions including a condition that the network device 103 has not been used for a predetermined time period. It should be noted that unless otherwise specified, the illustrated process is executed by the CPU 201, by executing a control program read from the memory, such as the ROM 202 or the HDD, not shown, of the network device 103.

In a step S401, upon starting the control program, the network device 103 determines whether or not the external device 107 can be accessed, and if it is determined that the external device 107 can be accessed (YES to S401), the network device 103 proceeds to a step S403. On the other hand, if it is determined that the external device 107 cannot be accessed (NO to S401), the network device 103 proceeds to a step S402, wherein the network device 103 continues to provide the web service without requesting the external device 107 to execute the proxy web service process. The determination in the step S401 as to whether the external device 107 can be accessed is executed by setting a destination address to the address of the external device 107 and determining whether access to the destination address from the network device 103 via a network can be successfully performed.

In the step S403, the network device 103 sends an activation request to the external device 107 to request activation of the proxy web service process. Upon receipt of the activation request, the external device 107 secures an area in the memory for storing web service data of the network device 103. It should be noted that processing executed by the external device 107 after receiving the activation request will be described in detail with reference to FIG. 7.

In a step S404, the network device 103 determines whether or not a web service data request is received from the external device 107, and if it is determined that the web service data request is received (YES to S404), the network device 103 proceeds to a step S405. On the other hand, if it is determined that the web service data request is not received (NO to S404), the network device 103 proceeds to a step S406.

In the step S405, the network device 103 transmits web service data to the external device 107. The web service data is contents data necessary for providing the web service, such as HTML files for responding to the web service request during provision of the web service, GIF files, JPEG files, JAVA (registered trademark) script files, and style sheets.

Next, in the step S406, the network device 103 determines whether or not a device data request is received from the external device 107, and if it is determined that the device data request is received (YES to S406), the network device 103 proceeds to a step S407. On the other hand, it is determined that the device data request is not received (NO to S406), the network device 103 proceeds to a step S408.

In the step S407, the network device 103 transmits the device data to the external device 107. The device data includes registration data set in the network device 103, a log file storing an operation history of network device 103, and a counter storing the number of the operations of the network device 103. The device data is used when displaying the state of the network device 103 in the web service, and inputting registration data.

In the step S408, the network device 103 determines whether or not to start the proxy web service process by the external device 107, and if it is determined that the proxy web service process is to be started (YES to S408), the network device 103 proceeds to a step S410. It should be noted that this determination is executed by determining whether or not the network device 103 is to shift to the sleep state on condition of satisfaction of the predetermined conditions. If the network device 103 is to shift to the sleep state, the answer to the question of the step S408 is affirmative (YES). On the other hand, if it is determined that the proxy web service process is not to be started (NO to S408), the network device 103 proceeds to a step S409. In the step S409, the network device 103 determines whether or not there is any updated device data. If it is determined that there is any updated device data (YES to S409), the network device 103 proceeds to a step S416, wherein a request for updating the device data is transmitted to the external device 107. Then, the network device 103 returns to the step S407, wherein the updated device data is transmitted to the external device 107. On the other hand, if it is determined that the there is no updated device data (NO to S406), the process returns to the step S408.

To start the proxy web service process, in the step S410, the network device 103 configures settings of network redirection of web service requests and web service responses for the proxy response chip 204 of the network interface card 205 in order to cause the external device 107 to execute the proxy web service process. After making the redirect settings, when a web service request is received, the received data is redirected to the external device 107, and when a to-be-redirected web service response is received, the received to-be-redirected web service response is redirected to the source of the web service request. The other items set in the step S410 include a wake-up packet pattern for returning to the standby state, and a proxy response filter for responding to received packet data without returning to the standby state.

Next, in a step S411, the network device 103 sends the proxy web service process start instruction to the external device 107. Upon receipt of the proxy web service process start instruction, the external device 107 activates a second web service function for executing the proxy web service process on behalf of the network device 103.

In a step S412, the network device 103 executes a control process for the proxy response (proxy response process). When executing the step S412, the network device 103 shifts to the sleep state, and the electric power supply to the shaded function blocks shown in FIG. 2 is interrupted. It should be noted that details of the proxy response process in the step S412 will be described hereinafter with reference to FIG. 6.

In a step S413, the network device 103 determines whether or not to terminate the proxy web service process being executed by the external device 107. This may be performed by e.g. determining whether or not the network device 103 has returned from the sleep state. If it is determined that the proxy web service process is to be terminated (YES to S413), the network device 103 proceeds to a step S414, whereas if it is determined that the proxy web service process is to be continued (NO to S413), the proxy response process in the step S412 is continued.

In the step S414, the network device 103 sends a proxy web service process-terminating instruction for instructing the external device 107 to terminate the proxy web service process. Then, in a step S415, the network device 103 requests the device data from the external device 107, and acquires the device data configured in the external device 107 during the proxy response process. When the step S415 is terminated, the network device 103 returns to the step S408, wherein the determination of whether or not to start the proxy web service process by the external device 107 is executed.

Figure 5:
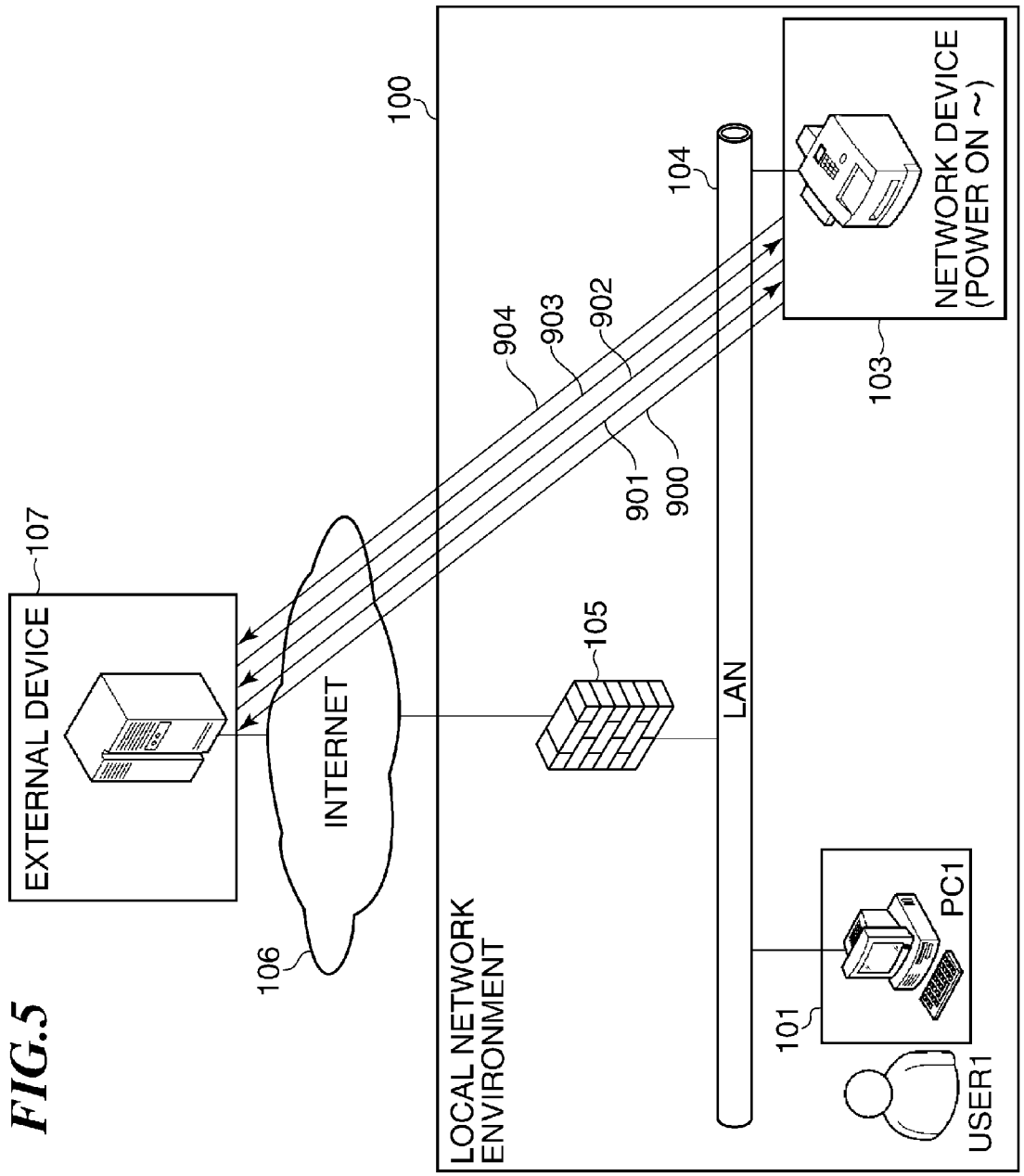
FIG. 5 is a diagram illustrating a starting operation sequence for a proxy web service performed between the network device and the external device.

Next, a description will be given of a start sequence of operations for a proxy web service performed from turn-on of the power of the network device 103 to execution of the proxy web service process by the external device 107 with reference to FIG. 5. The illustrated example corresponds to the steps S403 to S407 in FIG. 4 and steps S701 to S709 in FIG. 7, described hereinafter.

After the power of the network device 103 is turned on (the power switch section 212 is turned on), when it is immediately before the network device 3 shifts to the sleep state due to satisfaction of the predetermined conditions including the condition that the network device 103 has not been used for a predetermined time period, an activation request 900 for activating the proxy web service process for the network device 103 is sent to the external device 107. Upon receipt of the activation request 900, the external device 107 sends a web service data request 901 to the network device 103 in order to acquire data for the proxy web service process used in the proxy web service.

Upon receipt of the web service data request 901, the network device 103 sends web service data 902 stored in the HDD 214 thereof to the external device 107. After receiving the web service data 902, the external device 107 sends a device data request 903 to the network device 103 in order to acquire the device data used for the proxy web service. The device data used for the proxy web service includes the registration data, the history data, the counter data, and so on, of the network device 103. In the web service provided by the network device 103, these items of data can be referred to and configured. Upon receipt of the device data request 903, the network device 103 transmits device data 904 stored in the HDD 213 to the external device 107.

It should be noted that so as to enable the external device 107 to execute the proxy web service process for any desired network device, the external device 107 may be configured to acquire various items of data from the network device in a manner timed to the start-up thereof. Further, as for acquisition of web service data and device data, it is possible for the external device 107 to store therein data of network devices, on a device mode-by-device model basis, and execute the proxy web service process based on model information received from one of the network devices.

Figure 6:
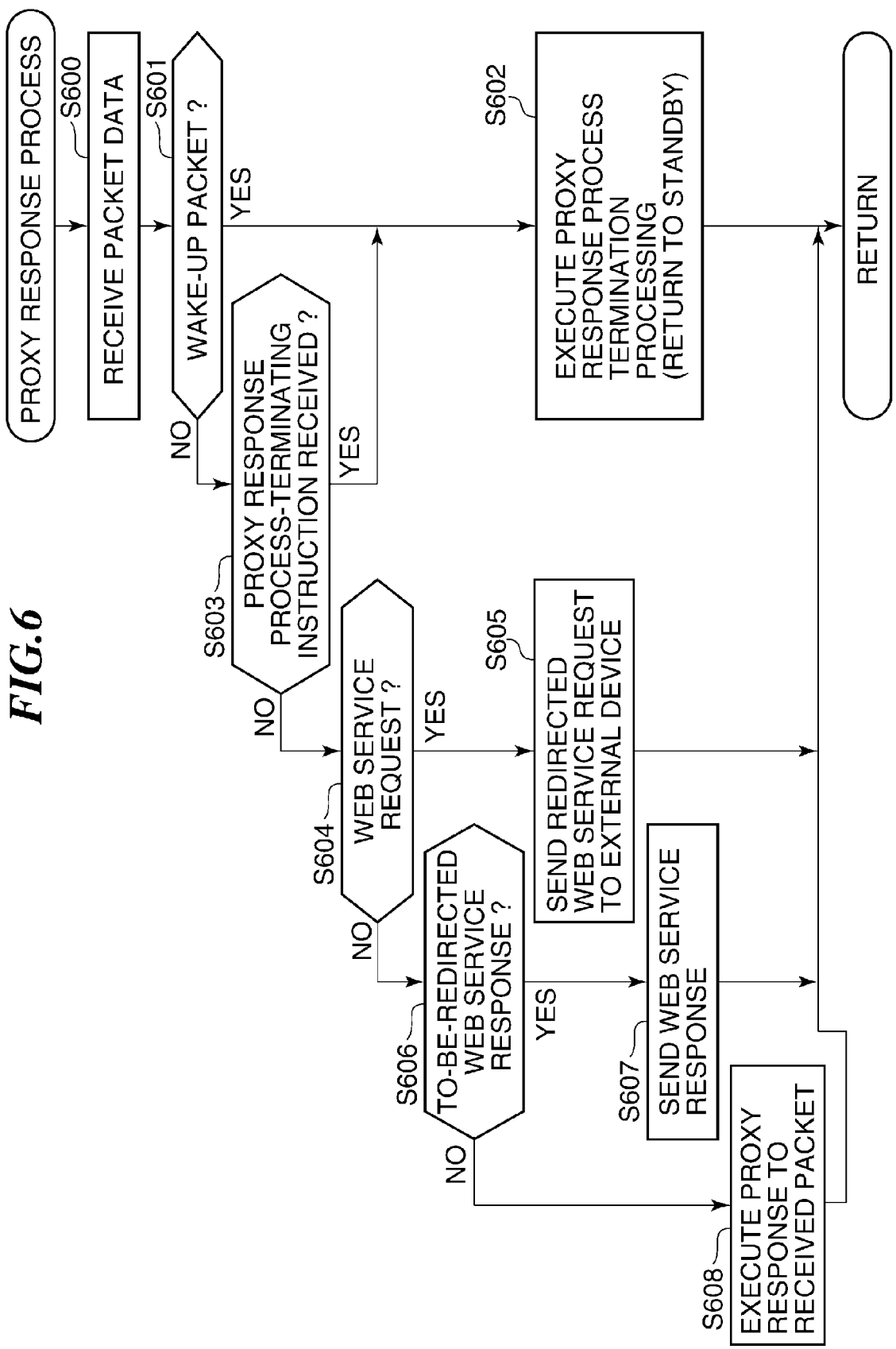
FIG. 6 is a flowchart of a proxy response process in the web service process in FIG. 4, which is executed by a proxy response chip of the network device.

FIG. 6 is a flowchart of the proxy response process executed by the proxy response chip 204 in the step S412 in FIG. 4.

In a step S600, the proxy response chip 204 receives packet data via the LAN 104. Next, in a step S601, the proxy response chip 204 determines whether or not the received packet data is wake-up packet data, and if it is determined that the received packet data is not wake-up packet data (NO to S601), the proxy response chip 204 proceeds to a step S603. On the other hand, if it is determined that the received packet data is wake-up packet data (YES to S601), the proxy response chip 204 proceeds to a step S602, wherein the proxy response chip 204 executes proxy response process termination processing to thereby cause the network device 103 to return to the standby state and terminate the proxy response, and returns.

In the step S603, the proxy response chip 204 determines whether or not the received packet data is a proxy response process-terminating instruction, and if it is determined that the received packet data is a proxy response process-terminating instruction (YES to S603), the proxy response chip 204 proceeds to the step S602. On the other hand, if it is determined that the received packet data is not a proxy response process-terminating instruction (NO to S603), the proxy response chip 204 proceeds to a step S604.

In the step S604, the proxy response chip 204 determines whether or not the received packet data is a web service request, and if it is determined that the received packet data is not a web service request (NO to S604), the proxy response chip 204 proceeds to a step S606. On the other hand, if it is determined that the received packet data is a web service request (YES to S604), the proxy response chip 204 proceeds to a step S605, wherein the proxy response chip 204 redirects the web service request to the external device 107, by adding the first redirection information thereto, and returns.

In the step S606, the proxy response chip 204 determines whether or not the received packet data is a to-be-redirected web service response, and if it is determined that the received packet data is not a to-be-redirected web service response (NO to S606), the proxy response chip 204 proceeds to a step S608, wherein the proxy response chip 204 executes the proxy response process on the received packet, and returns. On the other hand, if it is determined in the step S606 that the received packet data is a to-be-redirected web service response (YES to S606), the proxy response chip 204 proceeds to a step S607. In the step S607, the proxy response chip 204 deletes the second redirection information from the to-be-redirected web service response data and then transmits the web service response data included in the to-be-redirected web service response data, and returns.

Figure 7:
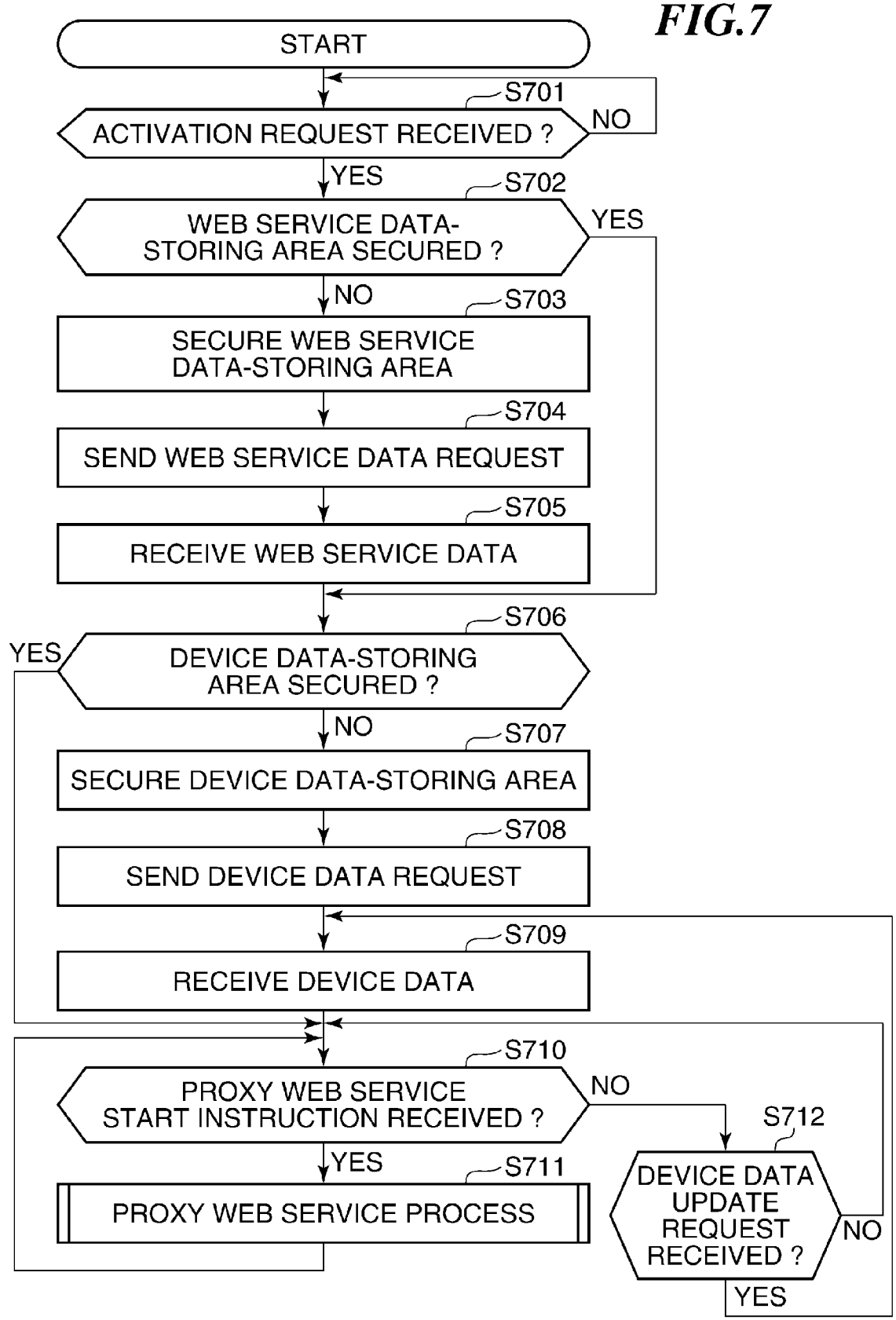
FIG. 7 is a flowchart of a web service process executed by an external device.

FIG. 7 is a flowchart of a web service process executed by the external device 107. The illustrated process is executed by the CPU of the external device 107 which executes a control program read from a memory, such as the ROM or the HDD in the external device 107.

In a step S701, the external device 107 determines whether or not an activation request for activating the proxy web service process is received from the network device 103, and if it is determined that the activation request is received (YES), the external device 107 proceeds to a step S702. On the other hand, if it is determined that the activation request is not received (NO), the external device 107 awaits receipt of the activation request in the step S701.

In the step S702, the external device 107 determines whether or not an area for storing web service data associated with the network device 103 as a source or sender of the activation request has been secured on the memory, and if it is determined that the storage area has been secured (YES), the external device 107 proceeds to a step S706. On the other hand, if it is determined that the storage area has not been secured (NO), the external device 107 proceeds to a step S703.

In the step S703, the external device 107 secures the area for storing the web service data associated with the network device 103 which has sent the activation request. In a step S704, the external device 107 sends a web service data request to the network device 103 which has sent the activation request. In a step S705, the external device 107 receives the web service data (web service data reception), and stores the received web service data in the web service data-storing area secured in the step S703.

In the step S706, the external device 107 determines whether or not an area for storing device data associated with the network device 103 which has sent the activation request has been secured on the memory, and if it is determined that the storage area has been secured (YES to S706), the external device 107 proceeds to a step S710. On the other hand, if it is determined that the storage area has not been secured (NO to S706), the external device 107 proceeds to a step S707.

In the step S707, the external device 107 secures the area for storing the device data associated with the network device 103 which has sent the activation request, on the memory. In a step S708, the external device 107 sends a device data request to the network device 103 which has sent the activation request, to acquire information including the registration data, history data, and counter data of the network device 103. In a step S709, the external device 107 receives the device data of the network device 103 which has sent the activation request (device data reception), and stores the received device data in the device data-storing area secured in the step S707.

In the step S710, the external device 107 determines whether or not a proxy web service process start instruction is received from the network device 103, and if it is determined that the proxy web service process start instruction is received (YES to S710), the external device 107 proceeds to a step S711, wherein the proxy web service process is executed. Details of this proxy web service process will be described with reference to FIG. 8.

If it is determined in the step S710 that the proxy web service process start instruction is not received (NO to S710), the external device 107 proceeds to a step S712, wherein the external device 107 determines whether or not a request for updating the device data is received. If it is determined that the request for updating the device data is received (YES to S712), the external device 107 proceeds to the step S709. On the other hand, if it is determined that the request for updating the device data is not received (NO to S712), the process returns to the step S710, wherein the determination of whether or not the proxy web service process start instruction is received is continued.

Figure 8:
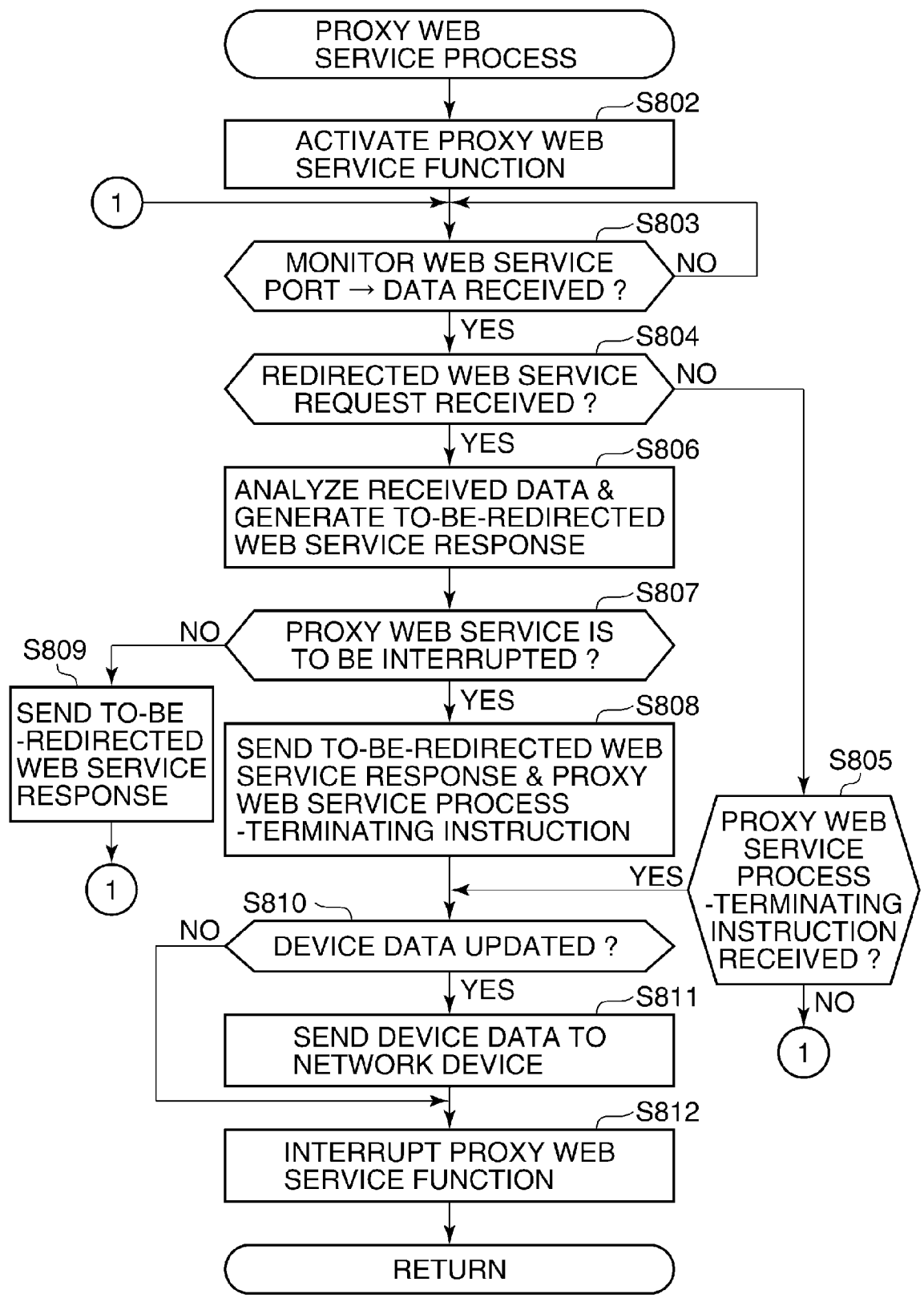
FIG. 8 is a flowchart of a proxy web service process in the web service process in FIG. 7, which is executed by the external device.

FIG. 8 is a flowchart showing details of the proxy web service process executed by the external device 107 in the step S711 in FIG. 7.

First, in a step S802, the external device 107 starts up the proxy web service function, and shifts to a state of awaiting reception of packet data at a communication port (web service port) provided for the web service.

Next, in a step S803, the external device 107 monitors the web service port, and determines whether or not data is received. If it is determined that data is received (YES to S803), the external device 107 proceeds to a step S804. On the other hand, if it is determined that no data is received (NO to S803), the determination of whether or not data is received is continued.

In the step S804, the external device 107 determines whether or not the received data is a redirected web service request, and if it is determined that the received data is a redirected web service request (YES to S804), the external device 107 proceeds to a step S806. On the other hand, if it is determined that the received data is not a redirected web service request (NO to S804), the external device 107 proceeds to a step S805.

In the step S806, the external device 107 analyzes a web service request section of the received data of the redirected web service request, and generates a to-be-redirected web service response based on the web service data stored in the web service data-storing area. Further, based on the received web service request, the device data stored in the device data-storing area generated in the step S707 is updated. Next, in a step S807, the external device 107 determines based on the result of analysis in the step S806 whether or not the web service request is a request for interrupting the proxy web service process. If it is determined in the step S807 that the web service request is not a request for interrupting the proxy web service process (NO to S807), the external device 107 proceeds to a step S809, wherein the to-be-redirected web service response generated in the step S806 is sent, and the process returns to the step S803.

On the other hand, if it is determined in the step S807 that the web service request is a request for interrupting the proxy web service process (YES to S807), the external device 107 proceeds to a step S808. In the step S808, after sending the to-be-redirected web service response generated in the step S806, the external device 107 sends the proxy response process-terminating instruction to the network device 103, and then the external device 107 proceeds to a step S810. At this time, upon receipt of the proxy response process-terminating instruction from the external device 107, the network device 103 terminates the proxy response process.

Next, in the step S810, the external device 107 determines whether or not there is any device data that has been updated during execution of the proxy web service process, and if it is determined that there is device data that has been updated (YES to S810), the external device 107 proceeds to a step S811. In the step S811, the external device 107 transmits the updated device data received in the step S806 and stored in the external device, to the network device 103, and the external device 107 proceeds to a step S812.

On the other hand, if it is determined in the step S810 that there is no device data that has been updated (NO), the external device 107 directly proceeds to the step S812. In the step S812, the external device 107 interrupts the proxy web service function, and terminates monitoring the web service port.

In the step S805, the external device 107 determines whether or not the proxy web service process-terminating instruction is received. If it is determined that the proxy web service process-terminating instruction is received (YES to S805), the external device 107 proceeds to the step S810. On the other hand, if it is determined that proxy web service process-terminating instruction is not received (NO to S805), the external device 107 returns to the step S813.

According to the above-described first embodiment, when the network device 103 in the sleep state receives a web service request from the PC 1 or the like, the network device 103 generates a redirected web service request by adding the first redirection information thereto, and sends the redirected web service request to the external device 107. When generating a web service response to the redirected web service request received from the network device 103, the external device 107 adds the second redirection information thereto, and returns the resulting to-be-redirected web service response to the network device 103. The network device 103 deletes the second redirection information from the to-be-redirected web service response received from the external device 107, and transfers the web service response without the second redirection information to the source or sender of the web service request. This makes it possible to continue the proxy web service, while maintaining the sleep state of the network device, without installing the network device that provides the web service and the external device that provides the web service on behalf of the network device on the same subnet.

In the above-described first embodiment, as shown in FIG. 1, the description has been given of the configuration in which when the network device 103 is in the sleep state, the PC 1 or the like within the subnet receives a web service via the network device 103. In the second embodiment, the description will be given of a mode in which when the external device 107 has started a proxy web service, the PC 1 or the like in the subnet receives a web service from the external device 107 without via the network device 103. It should be noted that a network system according to the second embodiment has the same basic configuration as that of the network system according to the first embodiment, and hence elements identical or similar to corresponding ones of the first embodiment are denoted by the same reference numerals, while omitting the description thereof. Only different points of the second embodiment from the first embodiment will be described hereinafter.

Figure 9:
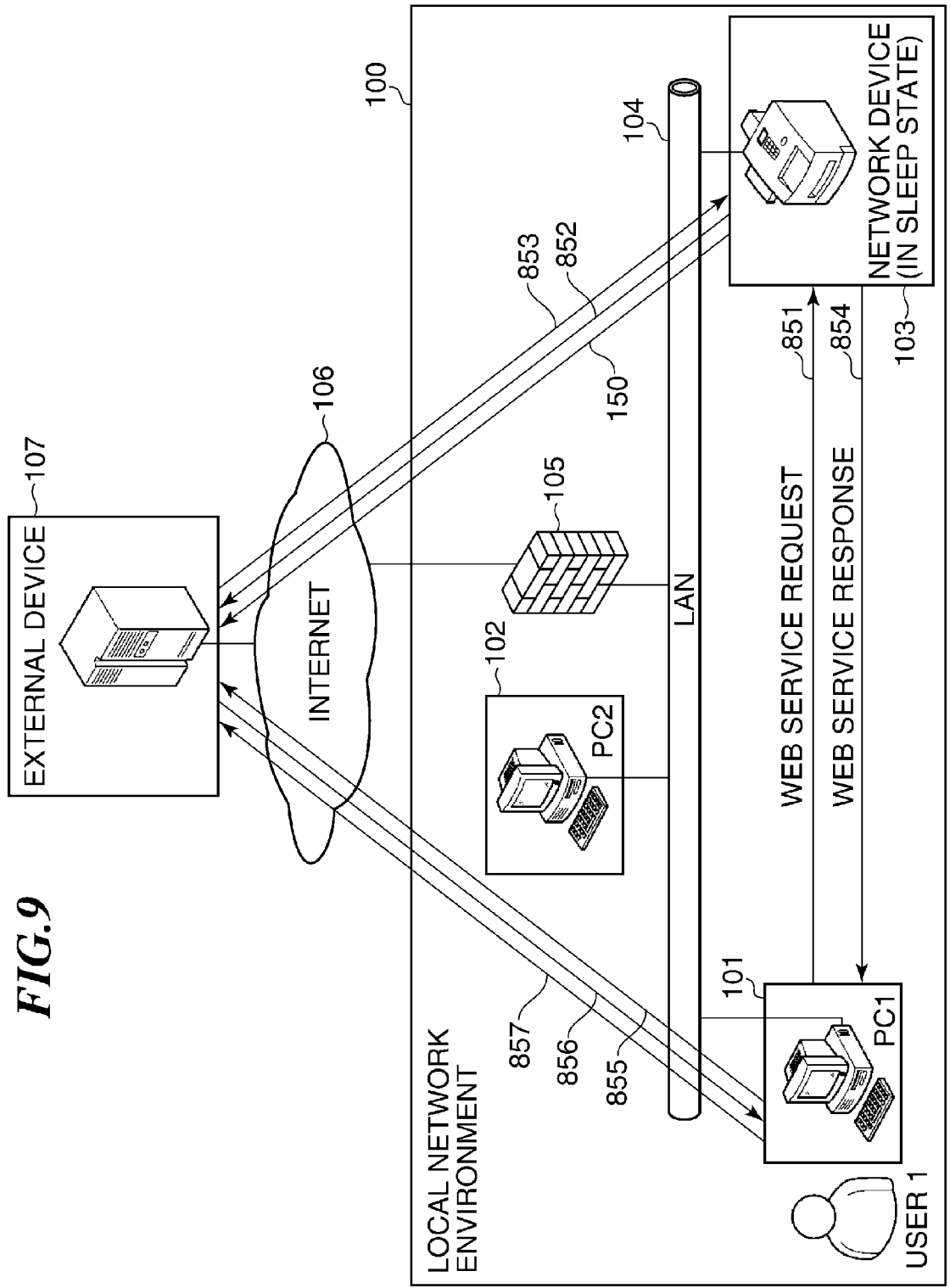
FIG. 9 is a schematic diagram of a network system according to a second embodiment of the present invention.

FIG. 9 is a schematic diagram of the network system according to the second embodiment of the present invention.

In FIG. 9, the network device 103 has a power saving function for shifting to the "sleep (reduced power consumption) state" when the network device 103 is not in use in order to reduce power consumption, and sends the proxy web service process start instruction 150 to the external device 107 when shifting to the sleep state. Upon receipt of the proxy web service process start instruction 150, the external device 107 starts the proxy web service process.

When the user 1 accesses the network device 103 from the browser activated on the PC 1 101, the web browser sends a web service request 851 to the network device 103. Since the network device 103 is in the sleep state, the network device 103 converts the received web service request 851 (first web service request) to a redirected web service request 852, and sends the redirected web service request 852 to the external device 107 by the proxy response function. The redirected web service request 852 is in the same form as that of the above-mentioned redirected web service request 303, in which the web service request 851 is included.

The external device 107 receives the redirected web service request 852, and generates data of a web service response 854 (first web service response) associated with the web service request 851 included in the redirected web service request 852, based on the web service data in which reference addresses of the data are converted from the addresses of the network device 103 to the corresponding addresses of the external device 107, and then, transmits the data to the network device 103 as a to-be-redirected web service response 853.

The network device 103 receives the to-be-redirected web service response 853 from the external device 107, and sends the web service response 854 included in the to-be-redirected web service response 853 to the web browser of the PC 1 101 as the source or sender of the web service request 851. The web service response 854 has the reference addresses of the data included therein converted to those of the external device 107 by the external device 107. Therefore, the web browser operating on the PC 1 101 sends a web service request 855 (second web service request) to the address of the external device 107 which is stated in the reference addresses of the data, next time.

Upon receipt of the web service request 855 from the PC 1 101, the external device 107 sends a web service response 856 (second web service response) directly to the PC 1 101, which is the same as a web service response to be returned by the network device 103. The reference addresses of data of the web service response 856 received by the PC 1 101 were converted to the address of the external device 107, as mentioned above. Therefore, after this time on as well, when dispatching a web service request by the web browser of the PC 1 101, the web service request is directly sent from the PC 1 101 to the external device 107 (web service request 857). Further, a web service response from the external device 107 is directly sent to the PC 1 101 which is the source of the web service request. Thus, the proxy web service is provided by the external device 107.

As described above, simultaneously when the network device 103 enters the sleep state, the provider of the web service is changed to the external device 107, which makes it possible to provide the web service by the external device 107 while the network device 103 remains in the sleep state. Further, the network traffic to the network device 103 is reduced, whereby the load in the proxy response process of the network device 103 is reduced, which is effective for reducing power consumption of the network device 103 during the sleep state thereof.

Figure 10B:
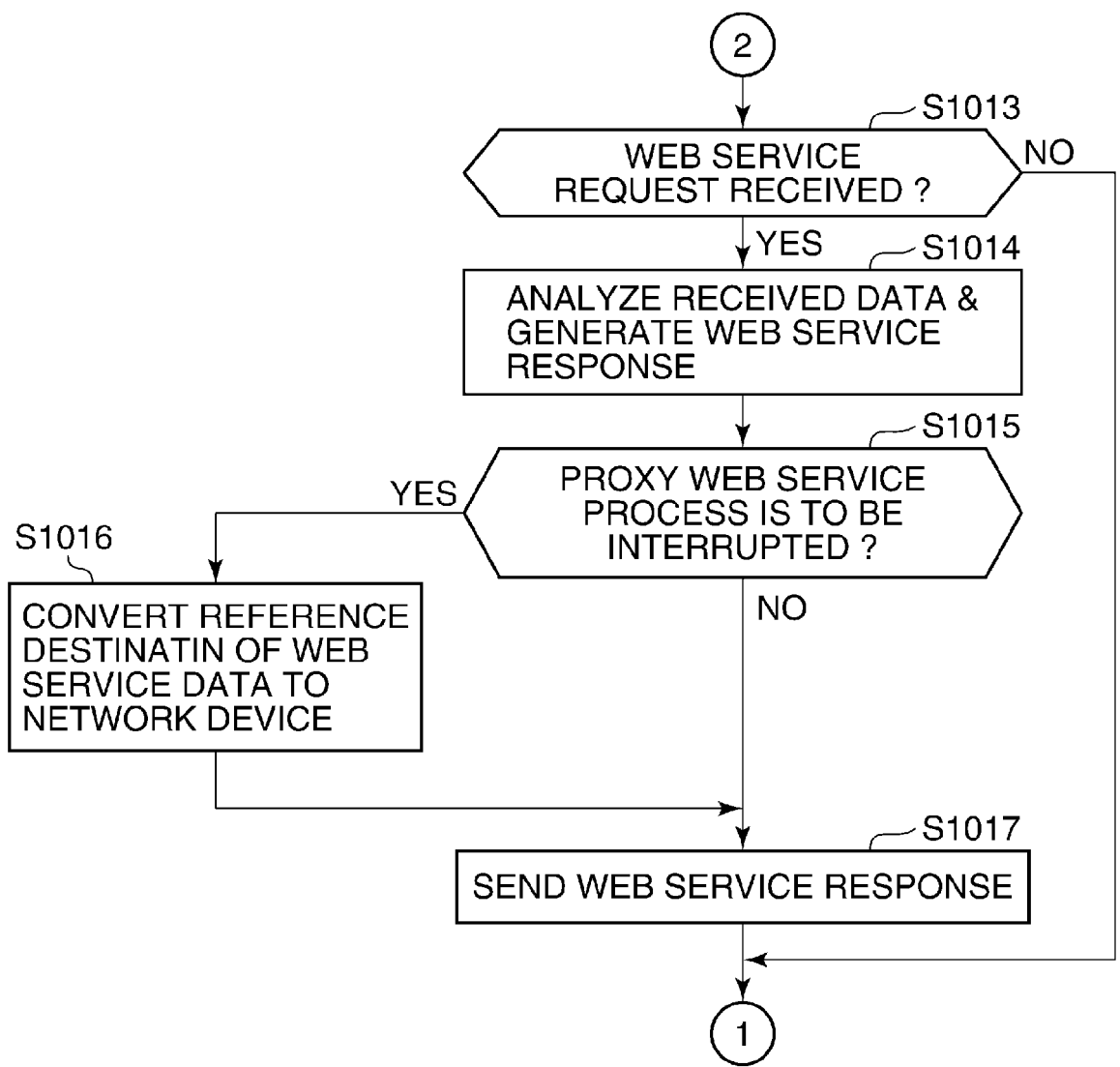

Next, the proxy web service process executed by the external device 107 of the network system according to the second embodiment will be described with reference to FIGS. 10A and 10B. In this proxy web service process, steps S1002 to S1012 in FIG. 10A correspond to the steps S802 to S812 of the corresponding process in the first embodiment described hereinbefore with reference to FIG. 8, respectively, and the process is only different from the corresponding process in the first embodiment in that a step S1001 is added at the start, and if the answer to a step S1005 (corresponding to the step S805 in FIG. 8 in the first embodiment) is negative (NO), the external device 107 proceeds to steps S1013 to S1017 in FIG. 10B, instead of returning to a step S1003 (corresponding to the step S803 in FIG. 8). Therefore, the following description will be given of these steps S1001 and S1013 to S1017.

In the step S1001, the reference addresses of web service data received from the network device 103 are converted from addresses of the network device 103 to addresses of the external device 107, and then the external device 107 proceeds to a step S1002. Since the step S1002 to a step S1012 are identical to the steps S802 to S812 in FIG. 8, description thereof is omitted.

If it is determined in the step S1005 (corresponding to the step S805 in FIG. 8) that that the proxy web service process-terminating instruction is not received (NO to S1005), the external device 107 proceeds to a step S1013, wherein the external device 107 determines whether or not the received data is a web service request. If it is determined that the received data is a web service request (YES to S1013), the external device 107 proceeds to the step S1014. On the other hand, if it is determined that the received data is not a web service request (NO to S1013), the external device 107 proceeds to the step S1003 in FIG. 10A.

In the step S1014, the external device 107 analyzes the received data of the web service request, and generates a web service response, based on the web service data in which reference addresses of the data are converted from the addresses of the network device 103 to the corresponding addresses of the external device 107. Next, in the step S1015, the external device 107 determines based on a result of the analysis in the step S1014 whether or not the web service request is a request for interrupting the proxy web service process. If it is determined that the web service request is not a request for interrupting the proxy web service process (NO to S1015), the external device 107 proceeds to the step S1017. On the other hand, if it is determined that the web service request is a request for interrupting the proxy web service process (YES to S1015), the external device 107 proceeds to the step S1016, wherein the external device 107 converts the reference addresses in the web service data from the addresses of the external device 107 to the addresses of the network device 103, and then the external device 107 proceeds to the step S1017. In the step S1017, the external device 107 sends the web service response generated in the step S1014 to the source of the web service request, and then proceeds to the step S1003 in FIG. 10A.

Figure 11:
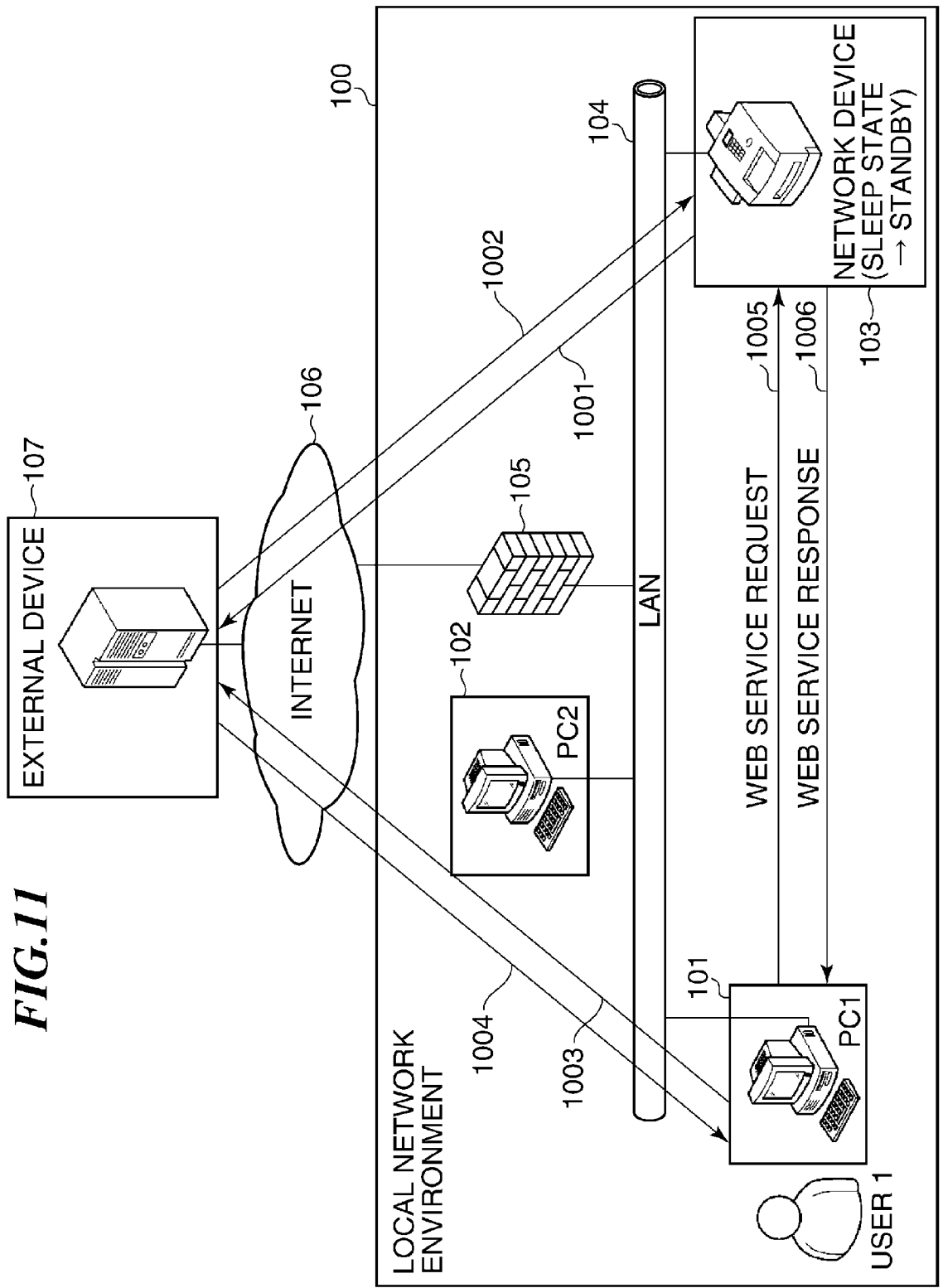
FIG. 11 is a diagram illustrating a termination operation sequence in a case where termination of the proxy web service process is executed by a network device of the network system.

Next, in the network system of the second embodiment, a description will be given of a termination operation sequence in a case where the termination of the proxy web service is executed by the network device 103, with reference to FIG. 11.

Upon returning from the sleep state to the standby state, the network device 103 sends the proxy web service process-terminating instruction 1001 to the external device 107 in order to cause the same to terminate the proxy web service process. Upon receipt of the proxy web service process-terminating instruction 1001, the external device 107 transmits the device data set during the proxy web service to the network device 103 (device data transmission 1002).

The network device 103 stores the received device data in the memory of thereof, such as the RAM 203 or the HDD.

The PC 1 101 sends a web service request 1003 to the external device 107 assuming that the proxy web service by the external device 107 is continued. Upon receipt of the web service request from the PC 1 101, the external device 107 sends a web service response 1004 in which the reference addresses are converted to the addresses of the network device 103, to the PC 1 101. The PC 1 sends a web service request 1005 to the network device 103, based on the reference address of the received web service response 1004. The network device 103 sends a web service response 1006 to the received web service request 1005, to the PC 1 101.

Figure 12:
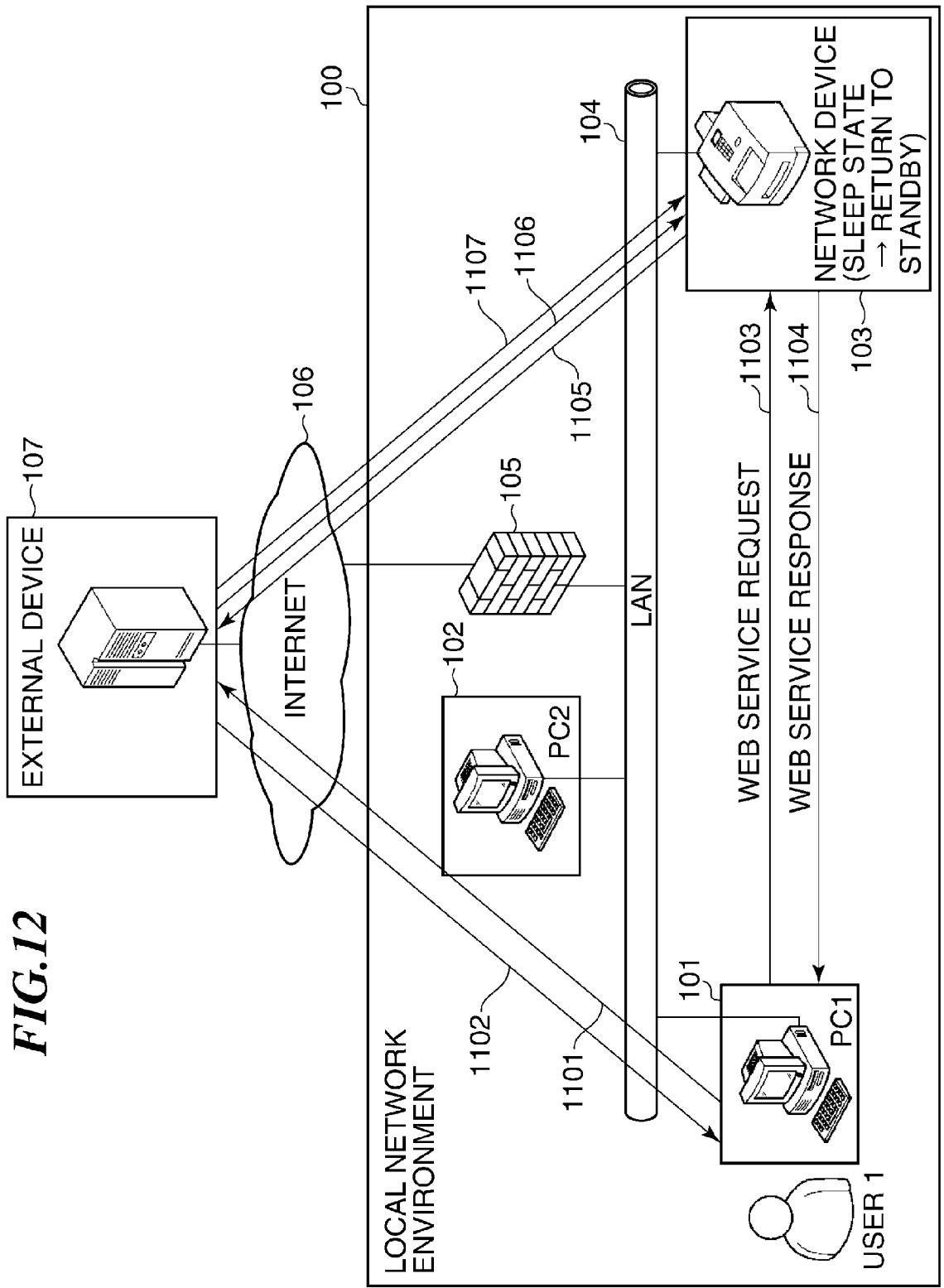
FIG. 12 is a diagram illustrating a termination operation sequence in a case where termination of the proxy web service process is executed by the external device.

Next, in the network system of the second embodiment, a description will be given of a termination operation sequence in a case where the termination of the proxy web service is executed by the external device 107, with reference to FIG. 12.

The PC 1 101 sends a web service request 1101 to the external device 107 which is executing the proxy web service process. The external device 107 determines whether or not to interrupt the proxy web service by the received web service request 1101 (step S1015 in FIG. 10B) (web service interruption determination). If it is determined that the proxy web service is to be interrupted, a web service response 1102 in which the reference addresses are converted to the addresses of the network device 103 is sent to the PC 1 101.

The PC 1 sends a web service request 1103 to the network device 103, based on the reference address of the web service response 1102. Upon receipt of the web service request 1103, the network device 103 sends a redirected web service request 1105 to the external device 107 based on the redirect settings of the proxy response chip 204.

Upon receipt of the redirected web service request 1105, the external device 107 determines whether or not to interrupt the proxy web service process (step S1007 in FIG. 10A) (web service interruption determination). If it is determined that the proxy web service process is to be interrupted, a to-be-redirected web service response and a proxy web service process-terminating instruction 1106 are sent to the network device 103. Further, after sending the to-be-redirected web service response and the proxy web service process-terminating instruction 1106, if there is any device data stored in the external device 107 which has been updated during the proxy web service, the external device 107 transmits the updated device data to the network device 103 (device data transmission 1107).

Upon receipt of the proxy web service process-terminating instruction 1106 and the to-be-redirected web service response, the network device 103 returns from the sleep state to the standby state, and then sends a web service response 1104 associated with the web service request 1103, to the PC 1 101. Further, upon receipt of the updated device data from the external device 107, the network device 103 stores the device data in the memory thereof, such as the ROM 202 or the HDD.

It should be noted that as the method of terminating the proxy web service, when it is possible to directly access the network device 103 from the external device 107, it is also possible to terminate the proxy web service by sending the proxy web service process-terminating instruction to the network device 103.

According to the second embodiment, a web service to be provided by the network device 103 is provided by the proxy web service process of the external device 107, which makes the web service available without causing the network device 103 to return from the sleep state. Further, by causing the network communication for the web service to be executed between the PC 1 101 and the external device 107, the load placed on the network device 103 due to the proxy response process is reduced, which makes it possible to reduce the power consumption during the sleep state.

Although in the first and second embodiments described above, the web service request received by the network device 103 when it is in the sleep state is redirected to the external device 107, this is not limitative, but without executing the redirection of the web service request, a web service response in which the address of the external address 107 is set forth as the reference address of data may be generated by the network device 103. In this case, by generating and storing a web service response in which the address of the external device 107 is set forth as the reference address of data, in advance, it is also possible to reduce load of processing to be executed by the network device 103 when it is in the sleep state.

It should be noted that throughout the specification, the term "a proxy web service" is intended to mean "a web service provided by one device on behalf of another device that is to provide the web service" and the term "a proxy web service process" is intended to mean "a process executed by one device for the sake of a web service, on behalf of another device that is to provide the web service".

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-046562, filed Mar. 3, 2010, which is hereby incorporated by reference herein in its entirety.

What is claimed is:

1. A network system comprising:
   a network device that provides a web service to a network terminal; and
   an information processing device that provides the web service on behalf of the network device,
   wherein the network device comprises:
      a first web service unit configured to generate and return, in response to receipt of a web service request for receiving the web service from the network terminal, a web service response to the web service request;
      a shifting unit configured to shift the network device to a predetermined state including a reduced power consumption state;
      a first redirection unit configured to be operable when the network device has been shifted to the predetermined state by said shifting unit, to redirect a web service request received from the network terminal to the information processing device;
      a reception unit configured to receive, from the information processing device, a web service response which responds to the web service request redirected by said first redirection unit and in which the information processing device is designated as a reference destination of data contained in the web service response; and
      a second redirection unit configured to redirect the web service response received by said reception unit to the network terminal, and wherein the information processing device comprises:
      a second web service unit configured to generate and return, to the network device, the web service response which responds to the web service request redirected from the network device by said first redirection unit and in which the information processing device is designated as the reference destination of the data contained in the web service response.

2. The network system according to claim 1, wherein said second web service unit comprises:
   a web service data reception unit configured to receive web service data including content data necessary for providing the web service, from the network device; and
   a device data reception unit configured to receive device data stored in the network device, including a log file and a counter, from the network device,
   wherein said second web service unit generates and returns, in response to the web service request redirected from the network device, the web service response in which reference addresses of the received web service data are converted from addresses of the network device to addresses of the information processing device, to the network device.

3. The network system according to claim 2, wherein if the device data has been updated, said second web service unit transmits the updated device data to the network device.

4. The network system according to claim 2, wherein if termination of the web service which said second web service unit is providing on behalf of the network device is instructed, said second web service unit converts the addresses of the reference destinations of the received web service data from the addresses of said information processing device to the addresses of the network device.

5. The network system according to claim 1, wherein:
   said first redirection unit adds a transfer source address and a transfer destination address as first redirection information to a header part of data of the web service request, and
   said second redirection unit deletes a source address and a destination address added as second redirection information to a header part of data of the web service response.

6. A network device that provides a web service to a network terminal and performs communication with an information processing device which provides the web service on behalf of the network device, the network device comprising:
   a web service unit configured to generate and return, in response to receipt of a web service request for receiving the web service from the network terminal, a web service response to the web service request;
   a shifting unit configured to shift the network device to a predetermined state including a reduced power consumption state;
   a first redirection unit configured to be operable when the network device has been shifted to the predetermined state by said shifting unit, to redirect a web service request received from the network terminal to the information processing device;
   a reception unit configured to receive, from the information processing device, a web service response which responds to the web service request redirected by said first redirection unit and in which the information processing device is designated as a reference destination of data contained in the web service response; and
   a second redirection unit configured to redirect the web service response received from the information processing device by said reception unit to the network terminal.

7. The network device according to claim 6, wherein:
said first redirection unit adds a transfer source address and a transfer destination address as first redirection information to a header part of data of the web service request, and
said second redirection unit deletes a source address and a destination address added as second redirection information to the header part of data of the web service response.

8. An information processing device that performs communication with a network device which provides a web service to a network terminal, and provides the web service on behalf of the network device, the information processing device comprising:
a first reception unit configured to receive a first web service request transmitted from the network terminal and is redirected by the network device;
a generation unit configured to be operable when said first reception unit receives the first web service request, to generate a first web service response which responds to the first web service request and in which the information processing device is designated as a reference destination of data included in the first web service response;
a first transmission unit configured to transmit the first web service response generated by said generation unit to the network device;
a second reception unit configured to receive a second web service request transmitted from the network terminal without via the network device based on the reference destination of data included in the first web service response transmitted by said first transmission unit; and
a second transmission unit configured to transmit, to the network terminal, a second web service response to the second web service request without via the network device in response to the receipt of the second web service request by said second reception unit.

9. The information processing device according to claim 8, further comprising:
a web service data reception unit configured to receive web service data including content data necessary for providing the web service, from the network device; and
a device data reception unit configured to receive device data stored in the network device, including a log file and a counter, from the network device,
wherein said first transmission unit transmits, in response to the first web service request redirected from the network device, the first web service response in which reference addresses of the received web service data are converted from addresses of the network device to addresses of the information processing device, to the network device.

10. The information processing device according to claim 9, further comprising:
a third transmission unit configured to transmit, if the device data has been updated, the updated device data to the network device.

11. A proxy response method in a network system including a network device that provides a web service to a network terminal, and an information processing device that provides the web service on behalf of the network device, the method comprising the steps of:
generating and returning, in response to receipt of a web service request for receiving the web service from the network terminal by the network device, a web service response to the web service request;
shifting the network device to a predetermined state including a reduced power consumption state;
redirecting, when the network device has been shifted to the predetermined state, a web service request received from the network terminal to the information processing device;
generating and returning to the network device, by the information processing device, a web service response which responds to the web service request redirected from the network device and in which the information processing device is designated as a reference destination of data contained in the web service response;
receiving the web service response from the information processing device, by the network device; and
redirecting the web service response received from the information processing device by the network device to the network terminal.

12. A method of controlling a network device that provides a web service to a network terminal and performs communication with an information processing device which provides the web service on behalf of the network device, the method comprising the steps of:
generating and returning, in response to receipt of a web service request for receiving the web service from the network terminal, a web service response to the web service request;
shifting the network device to a predetermined state including a reduced power consumption state;
redirecting, when the network device has been shifted to the predetermined state, a web service request received from the network terminal to the information processing device;
receiving, from the information processing device, a web service response which responds to the redirected web service request and in which the information processing device is designated as a reference destination of data contained in the web service response; and
redirecting the web service response received from the information processing device to the network terminal.

13. A method of controlling an information processing device that performs communication with a network device which provides a web service to a network terminal, and provides the web service on behalf of the network device, the method comprising:
a first reception step of receiving a first web service request transmitted from the network terminal and is redirected by the network device;
a generation step of generating, when the first reception step receives the first web service request, a first web service response which responds to the first web service request and in which the information processing device is designated as a reference destination of data included in the first web service response;
a first transmission step of transmitting the first web service response generated in the generation step to the network device;
a second reception step of receiving a second web service request transmitted from the network terminal not via the network device based on the reference destination of data included in the first web service response transmitted in the first transmission step; and
a second transmission unit configured to transmit, to the network terminal, a second web service response to the second web service request not via the network device in response to the receipt of the second web service request in the second reception step.

14. A non-transitory computer-readable storage medium storing a computer-executable program which functions in a network system including a network device that provides a web service to a network terminal, and an information processing device that provides the web service on behalf of the network device, wherein the program causes the network device to provide:
- a first web service task that generates and returns, in response to receipt of a web service request for receiving the web service from the network terminal, a web service response to the web service request;
- a shifting task that shifts the network device to a predetermined state including a reduced power consumption state;
- a first redirection task that is operable when the network device has been shifted to the predetermined state by said shifting unit task, to redirect a web service request received from the network terminal to the information processing device;
- a reception task that receives, from the information processing device, a web service response which responds to the web service request redirected by said first redirection task and in which the information processing device is designated as a reference destination of data contained in the web service response;
- a second redirection task that redirects the web service response received by said reception task to the network terminal, and wherein the program causes said information processing device to function as:
- a web service task that generates and returns, to the network device, a web service response which responds to the web service request redirected from the network device by said first redirection task and in which the information processing device is designated as a reference destination of data contained in the web service response.

15. A non-transitory computer-readable storage medium storing a computer-executable program which functions in a network device that provides a web service to a network terminal, wherein the program causes the network device to provide:
- a web service that generates and returns, in response to receipt of a web service request for receiving the web service from the network terminal, a web service response to the web service request;
- a shifting task that shifts the network device to a predetermined state including a reduced power consumption state;
- a first redirection task that is operable when the network device has been shifted to the predetermined state by said shifting task, to redirect a web service request received from the network terminal to an information processing device;
- a reception task that receives, from the information processing device, a web service response which responds to the web service request redirected by said first redirection task and in which the information processing device is designated as a reference destination of data contained in the web service response; and
- a second redirection task that redirects the web service response received from the information processing device by said reception task to the network terminal.

16. A non-transitory computer-readable storage medium storing a computer-executable program which functions in an information processing device that performs communication with a network device which provides a web service to a network terminal, and provides the web service on behalf of the network device, wherein the program causes the information processing device to provide:
- a first reception task that receives a first web service request transmitted from the network terminal and is redirected by the network device;
- a generation task that is operable when said first reception task receives the first web service request, to generate a first web service response which responds to the first web service request and in which the information processing device is designated as a reference destination of data included in the first web service response;
- a first transmission task that transmits the first web service response generated by said generation task to the network device;
- a second reception task that receives a second web service request transmitted from the network terminal without via the network device based on the reference destination of data included in the first web service response transmitted by said first transmission task; and
- a second transmission task that transmits, to the network terminal, a second web service response to the second web service request without via the network device in response to the receipt of the second web service request by said second reception task.

* * * * *